United States Patent
Oesterheld et al.

(10) Patent No.: US 6,936,128 B2
(45) Date of Patent: Aug. 30, 2005

(54) REINFORCED, PRESSURE-RESISTANT FLEXIBLE TUBE FOR MECHANICAL END-WINDING SUPPORT FOR ROTATING ELECTRICAL MACHINES

(75) Inventors: Jörg Oesterheld, Birmensdorf (CH); Rico Gasparini, Rieden (CH); Thomas Baumann, Wettingen (CH)

(73) Assignee: ABB Research Ltd., Zurich (CH)

( * ) Notice: Subject to any disclaimer, the term of this patent is extended or adjusted under 35 U.S.C. 154(b) by 114 days.

(21) Appl. No.: 10/094,706

(22) Filed: Mar. 12, 2002

(65) Prior Publication Data

US 2002/0093114 A1 Jul. 18, 2002

Related U.S. Application Data

(62) Division of application No. 09/470,965, filed on Dec. 23, 1999, now Pat. No. 6,383,581.

(30) Foreign Application Priority Data

Dec. 28, 1998 (DE) .......................................... 198 60 413

(51) Int. Cl.[7] ................................................. B23B 1/08
(52) U.S. Cl. ............................... 156/244.11; 156/272.2; 156/307.3
(58) Field of Search ....................... 156/244.11, 244.13, 156/272.2, 307.3; 264/103, 171.13, 171.27; 428/34.1, 36.9, 34.4, 34.6, 36.1, 36.2, 36.3; 310/260, 270

(56) References Cited

U.S. PATENT DOCUMENTS

| | | |
|---|---|---|
| 3,691,416 A | 9/1972 | Drexler et al. |
| 3,693,416 A | 9/1972 | Drexter et al. |
| 3,866,073 A | 2/1975 | Gjaja |
| 3,949,257 A | 4/1976 | Cooper et al. |
| 3,991,334 A | 11/1976 | Cooper et al. |
| 4,283,840 A | 8/1981 | Merikallio et al. |
| 4,387,317 A | 6/1983 | Alkire et al. |
| 5,468,916 A | 11/1995 | Litenas et al. |
| 5,734,220 A | 3/1998 | Rowe et al. |
| 6,383,581 B1 * | 5/2002 | Oesterheld et al. ........ 428/34.1 |
| 6,646,363 B2 * | 11/2003 | Kylander et al. ........... 310/194 |

FOREIGN PATENT DOCUMENTS

| | | |
|---|---|---|
| CH | 599 270 | 5/1978 |
| DE | 70 15 282 | 4/1970 |
| DE | 1 488 429 | 5/1970 |
| DE | 42 18 969 A1 | 12/1993 |
| EP | 0 173 446 | 3/1986 |
| WO | 94/06194 | 3/1994 |

* cited by examiner

Primary Examiner—John T. Haran
(74) Attorney, Agent, or Firm—Burns, Doane, Swecker & Mathis, L.L.P.

(57) ABSTRACT

The present invention relates to a reinforced, pressure-resistant flexible tube for mechanical end-winding support for rotating electrical machines. The flexible tube according to the invention in this case comprises a glass fiber bundle which is encased by an inner glass cloth flexible tube. This glass cloth flexible tube is in turn externally coated with a polymer layer and is for its part surrounded by an outer glass cloth flexible tube. A matrix polymer is introduced into the inner glass cloth flexible tube and, after it has cured, the reinforced, pressure-resistant flexible tube can carry out its supporting and spacing function fully.

7 Claims, 1 Drawing Sheet

Figure 2:
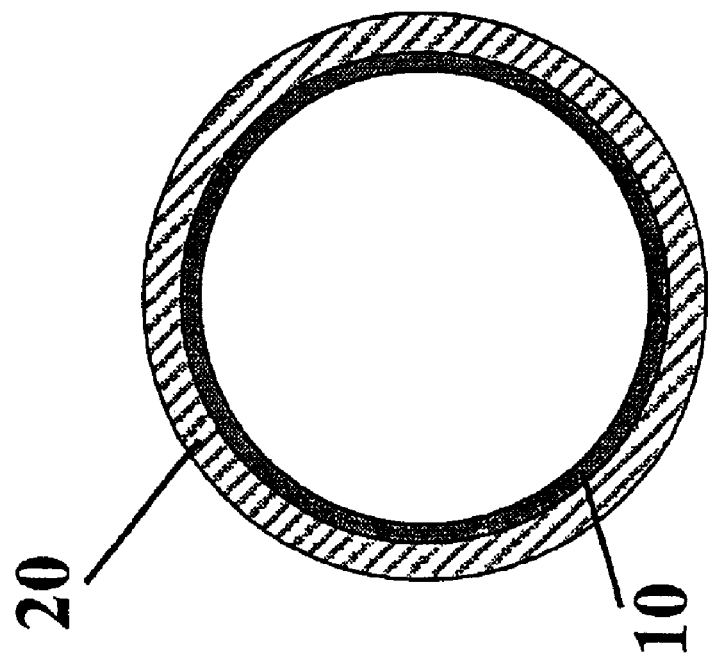

REINFORCED, PRESSURE-RESISTANT FLEXIBLE TUBE FOR MECHANICAL END-WINDING SUPPORT FOR ROTATING ELECTRICAL MACHINES

This application is a divisional application of U.S. Pat. Application No. 09/470,965 filed on Dec. 23, 1999, now U.S. Pat. No. 6,383,581.

FIELD OF THE INVENTION

The invention relates to the field of rotating electrical machines. In particular, the invention relates to a reinforced, pressure-resistant flexible tube for mechanical end-winding support for rotating electrical machines.

BACKGROUND OF THE INVENTION

It is possible to distinguish between various concepts in the case of supporting elements as are used these days in the fabrication of rotating electrical machines.

The first concept relates to machines whose winding is formed from already completely insulated conductor bars or coils, which are thus stiff and can be pressurized. In this case, fixed supporting rings are generally used, composed, for example, of thermoplastic or thermosetting plastic, which is generally reinforced. The supporting rings support the end winding from the outside and inside. In order to protect the conductors on the contact surfaces between the supporting ring and the conductor, plastic or elastic intermediate layers are generally used, which are generally curable, in some cases may be impregnated, and may be equipped to have a semiconducting capability. The supporting rings are generally braced with respect to the end winding by means of wedge systems.

In machines in which the complete stator is subjected to impregnation, a different supporting concept is used. Here, glass threads, that is to say threaded glass rovings or filled glass flexible tubes, that is to say axially bundled, unidirectional or knitted glass rovings, form a casing around the flexible tubes composed of woven glass rovings, and are introduced into an end winding in an annular shape. These threads or flexible tubes are impregnated during the impregnation of the stator and, when cured, form a fixed, radial supporting ring, which also provides the support and spacing between the individual conductors when laid in the form of plugs or loops.

Finally, in a third supporting concept for end windings of fully insulated windings, pressure-resistant flexible tubes, such as fire-service hoses, are used, which are laid in a suitable manner around the end winding in the dry state, in a similar way to the threads described above. In this case, the flexible tubes are simply placed just in an annular shape around and in the end windings, where they are then fixed by other elements, or they may be looped through between the conductors or plugged between the conductors. Once everything is ready, the flexible tube is filled with a low-viscosity resin or a resin with fillers in the form of powders or fibers and which is preferably cold-cured. After curing, solid rings are formed, which are optimally matched to the shape of the end winding.

However, all these supporting concepts mentioned above have certain disadvantages.

In the first supporting concept, a relatively large amount of manual work is required or, in some cases, it may be necessary to work with materials that are problematic in terms of health and safety at work, for example glass nonwoven or binder resins. Furthermore, the curing of binding agents is time-consuming, and may even require an additional heating process. In addition, the use of cold-curing intermediate layers may lead in operation, that is to say in the event of heating, to the prestressing of the supporting rings against the conductors becoming weaker due to creeping of this material when subject to continuous mechanical loading, thus resulting in the end winding having a tendency to oscillate and vibrate.

In contrast, the main disadvantage of the second concept is the need for impregnation. In machines in which this impregnation is impossible, this variant is not feasible or must be replaced by the injection of resin, which is dubious from the health and safety at work point of view, into the threads along the entire thread length, by means of spraying. The mechanical quality of the cured threads is, however, worse than in the case of vacuum-pressure impregnation since the resin penetration is inadequate owing to the large amount of air included.

Finally, in the third supporting concept, the mechanical stiffness of flexible tubes filled with pure resin is limited, particularly at relatively high temperatures, and very particularly for cold-curing resins. On the other hand, when filled resins are used, the processing capability is greatly limited since the fillers considerably increase the viscosity of the filling compound, so that only relatively short and kink-free flexible tubes can be filled without problems.

SUMMARY OF THE INVENTION

With regard to these problems with the conventional supporting concepts, the object of the present invention is to design a component by means of which it is possible to construct a simple support which can be fitted, can be matched and adjusted easily, and is very stiff, for conductors in the end winding of rotating electrical machines, with minimal mechanical creepage. As far as possible, a further aim is to avoid solvents and liquid adhesives, paints or varnishes in open contact with the environment.

DETAILED DESCRIPTION OF THE DRAWINGS

Figure 1:
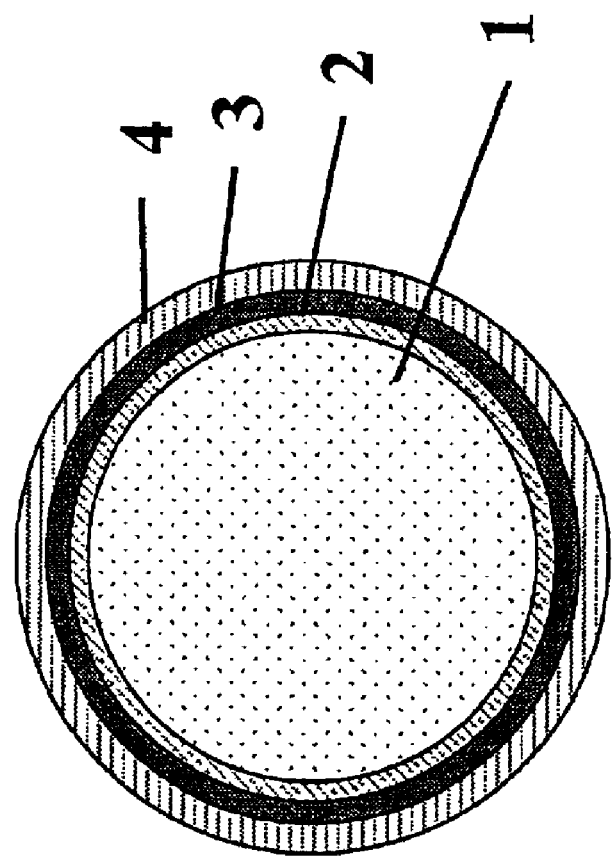

The invention will be explained in more detail in the following text with reference to embodiments illustrated in the drawing, in which:

FIG. 1 shows a reinforced, pressure-resistant flexible tube according to the invention, and FIG. 2 shows a conventional pressure-resistant flexible tube, in the form of a standard fire-service hose.

DETAILED DESCRIPTION OF THE INVENTION

The aim of the invention is to design a mechanical support for conductors in the end winding of rotating electrical machines. Pressure-resistant flexible tubes which can be filled and have various fittings are intended to be used for this purpose.

Conventional pressure-resistant flexible tubes are standard fire-service hoses, which comprise a dense, woven glass cloth hose 20, which is provided internally with flexible impregnation 10 which is gastight and liquidtight. Such a pressure-resistant flexible tube according to the prior art is shown in FIG. 2.

In comparison with the prior art, the reinforced, pressure-resistant flexible tube according to the invention is, however, constructed differently. A glass-fiber bundle 1 is encased by a more or less densely woven, inner glass cloth flexible tube 2, which is equipped on the outside with a gastight and liquidtight, flexible polymer layer 3. This polymer layer is in turn encased in a densely woven, outer glass cloth flexible tube 4. This construction of the flexible tube according to the invention is illustrated in FIG. 1.

The individual layers of the flexible tube may in turn be of different construction. The various construction options are explained in the following text.

First of all, the glass fiber bundle 1 may be composed of unidirectional glass fibers, unidirectional glass fiber rovings, interleaved layers of glass cloth flexible tubes or knitted glass fiber rovings of different diameter. Owing to the excellent axial capillary effect to be expected, it is most advantageous to use knitted glass fiber rovings of different diameter.

Further embodiments differ not only with respect to their construction, but also with respect to their production.

Firstly, the polymer layer 3 which encases the glass cloth flexible tube 2 that encloses the glass fiber bundle 1 can be produced by extrusion of a polymer layer on the filled flexible tube or by painting the flexible tube surface once or more with a polymer or a polymer solution. In this case, when ready to use, the polymer should preferably have elastomer characteristics.

In addition, the flexible tube can be attached to the winding elements by binding with preferably impregnated cloth strips or threads in the B-stage, which are cured during subsequent heat treatment. Furthermore, the flexible tube can in this case be produced by bonding, with winding elements to be supported, by additional application of adhesives to contact points or by subsequent impregnation of adhesive varnish while varnishing the entire end winding.

In addition, in a further embodiment, the polymer layer 3 may be slightly permeable for the matrix polymer which will be introduced later under pressure. This means that, at the start of the filling process, the polymer layer is sufficiently permeable that the matrix polymer slightly penetrates the polymer layer 3 and is absorbed or sucked up by capillary action by the fabric of the outer glass cloth flexible tube 4. Further emergence of matrix polymer is then suppressed by individual or joint swelling of the polymer layer 3 and/or of the outer glass cloth flexible tube 4 impregnated with matrix polymer, and/or increasing viscosity of the matrix polymer, and/or bonding of the permeable channels. The amount of matrix polymer which emerges can preferably be adjusted by suitable selection of the microporosity of the polymer layer 3, or suitable selection of the structure of the outer glass cloth flexible tube 4, in combination with the viscosity characteristics of the matrix polymer, such that, on the one hand, sufficient matrix polymer emerges in order to produce uniform impregnation of the outer glass cloth flexible tube 4, which can ensure sufficient bonding of the outer glass cloth flexible tube 4 to the winding elements to be supported. On the other hand, the emergence of matrix polymer must be limited sufficiently that no matrix polymer droplets can be formed, such that no matrix polymer can run out.

In a further embodiment, the bonding of the supporting element with the winding elements is achieved while maintaining the gastight and liquidtight polymer layer 3, that is to say a polymer layer 3 which is not permeable, in that the outer glass cloth flexible tube 4 is provided-at the end of the fabrication process with a polymer layer which remains in the 13-stage, melts and is cured in a heat process after fitting while, at the same time, the supporting element and winding elements are connected to one another by a force fit.

In another embodiment which may preferably be chosen, the matrix polymer is composed of a heat-curing resin which is as non-viscose as possible, in order to achieve good impregnation and good filling of long flexible tubes, and carries out a virtual-curing process by virtue of appropriate additives, at room temperature. In consequence, no special heat process is required for curing. The support then acquires all the good mechanical characteristics of the heat-curing system during running in and during the heating of the machine linked to this.

For machines where the thermal stress is low, it is sensible to use a cold-curing resin system as the matrix polymer. Once again, there is no additional heat process. The poorer mechanical characteristics of cold-curing materials at relatively high temperatures in this case present no problems owing to the low thermal utilization of the machine because of the low operating temperatures.

In a further embodiment, heat-curing resins may also be used as the matrix polymer. This is worthwhile when, for other reasons, a heat process is necessary, which then also carries out the process of curing the supporting elements.

In special embodiments, a heat-curing matrix polymer may also be used without any heat process or furnace process being required. In this case, fillers corresponding to the resin must be added, which produce losses and thus heat for example due to inductive or capacitive excitation, for example by microwaves, so that the matrix polymer is cured. Alternatively, the flexible tube or parts of the flexible tube may also be equipped such that heat can be produced resistively by application of voltage, for example by means of integrated heating strips.

What is claimed is:

1. A method for producing a reinforced, pressure-resistant flexible tube for the mechanical end-winding support for rotating electrical machines, comprising:

encasing a glass fiber bundle with an inner glass cloth flexible tube, providing a first polymer layer on the inner glass cloth flexible tube by extruding a polymer layer on the inner glass cloth flexible tube, or painting, at least once, the surface of the inner glass cloth flexible tube with a polymer or a polymer solution, and encasing the inner glass cloth flexible tube, with the first polymer layer thereon with an outer glass cloth flexible tube.

2. The method as claimed in claim 1, comprising:

attaching the flexible tube to winding elements by binding them with impregnated cloth strips or threads which are in the B-stage, and curing these cloth strips or threads by heat treatment, or bonding the flexible tube with winding elements to be supported by additionally applying adhesives to contact points or by subsequent impregnation of adhesive varnish while varnishing the entire end winding.

3. The method as claimed in claim 2, comprising:

coating the outer glass cloth flexible tube using a second polymer layer which remains in the B-stage, melting the second polymer layer after fitting the second polymer, in a heat process, and curing the second polymer layer, wherein the first polymer layer is gas tight and liquid tight.

4. The method as claimed in claim 1, comprising:

filling the inner glass cloth flexible tube with a matrix polymer, impregnating the first polymer layer and the outer glass cloth flexible tube with the matrix polymer, and bonding permeable channels in the first polymer layer.

5. The method as claimed in claim 1, comprising:

filling the outer glass cloth flexible tube with a heat-curing matrix polymer, curing the heat-curing matrix polymer for support (i) while a rotating electrical machine is being run in, (ii) by the heating produced in the process of curing the heat-curing matrix polymer by inductive or capacitive excitation, or (iii) by applying voltage to parts of the flexible tube with heat being produced resistively.

6. The method as claimed in claim 5, wherein the heat-curing matrix polymer is cured using microwaves.

7. The method as claimed in claim 5, wherein the heat-curing matrix polymer is cured by applying voltage to parts of the flexible tube in which heating strips are integrated.

* * * * *